Oct. 24, 1933.  S. P. WEEK  1,931,782
CORN COMBINE
Filed Nov. 30, 1931   5 Sheets-Sheet 1

Witness
H. S. Munzenmaier

Inventor
Sanford P. Week
By Bair, Freeman & Sinclair
Attorneys

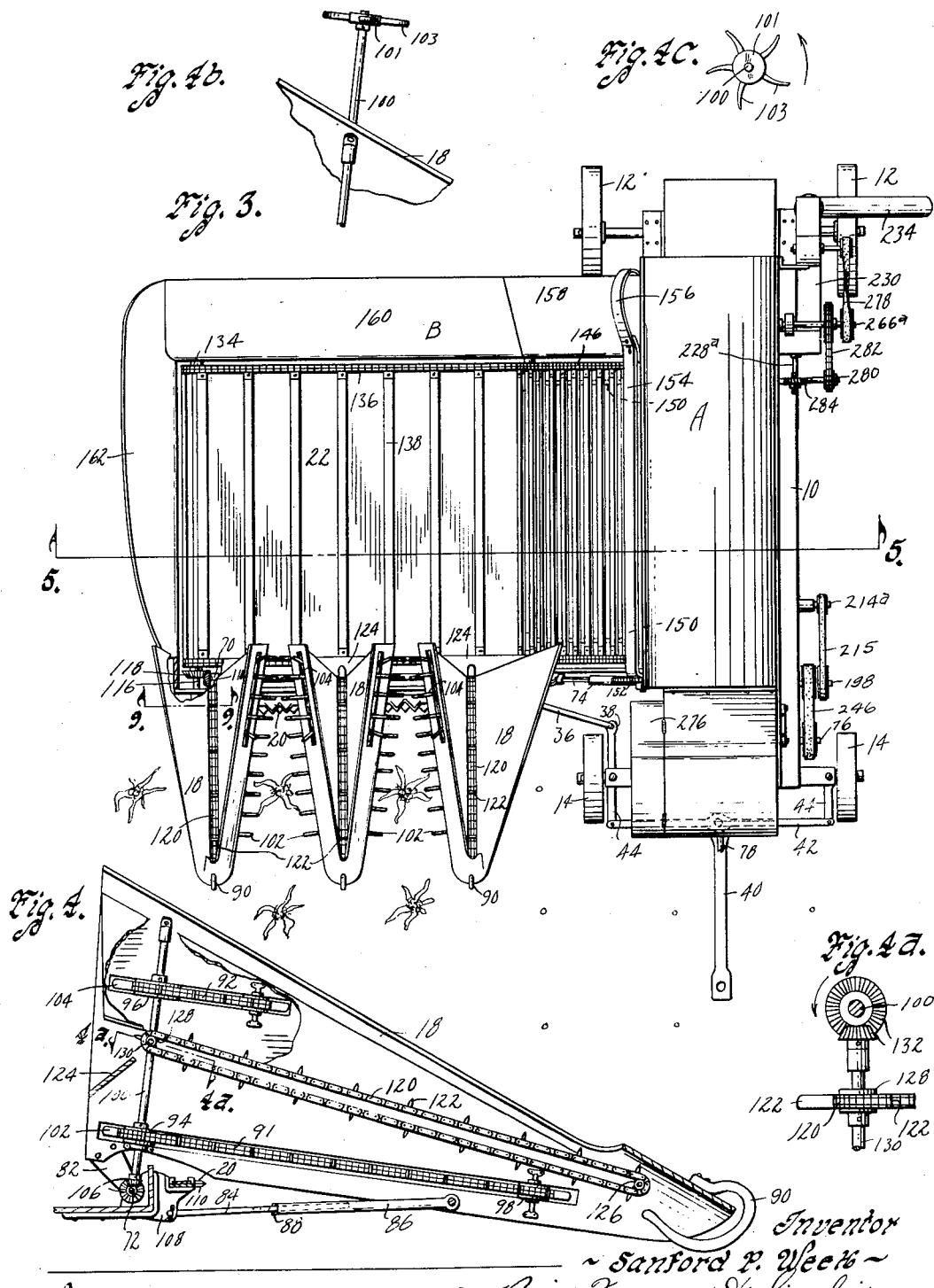

Oct. 24, 1933.  S. P. WEEK  1,931,782
CORN COMBINE
Filed Nov. 30, 1931   5 Sheets-Sheet 3
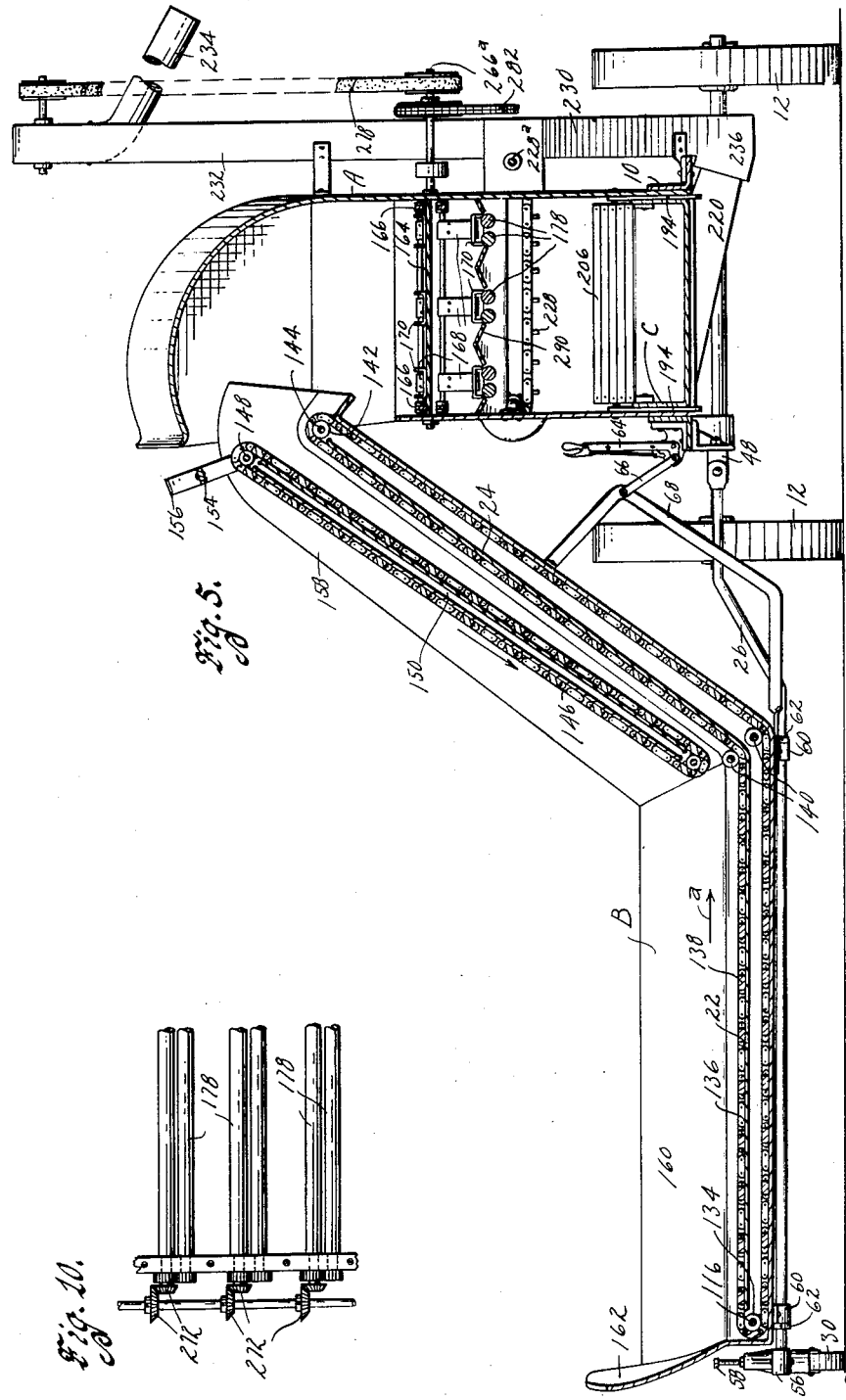

Oct. 24, 1933.  S. P. WEEK  1,931,782
CORN COMBINE
Filed Nov. 30, 1931  5 Sheets-Sheet 4

Inventor
~ Sanford P. Week ~
by Bair, Freeman & Sinclair
Attorneys

Witness
H. S. Menzenmaier

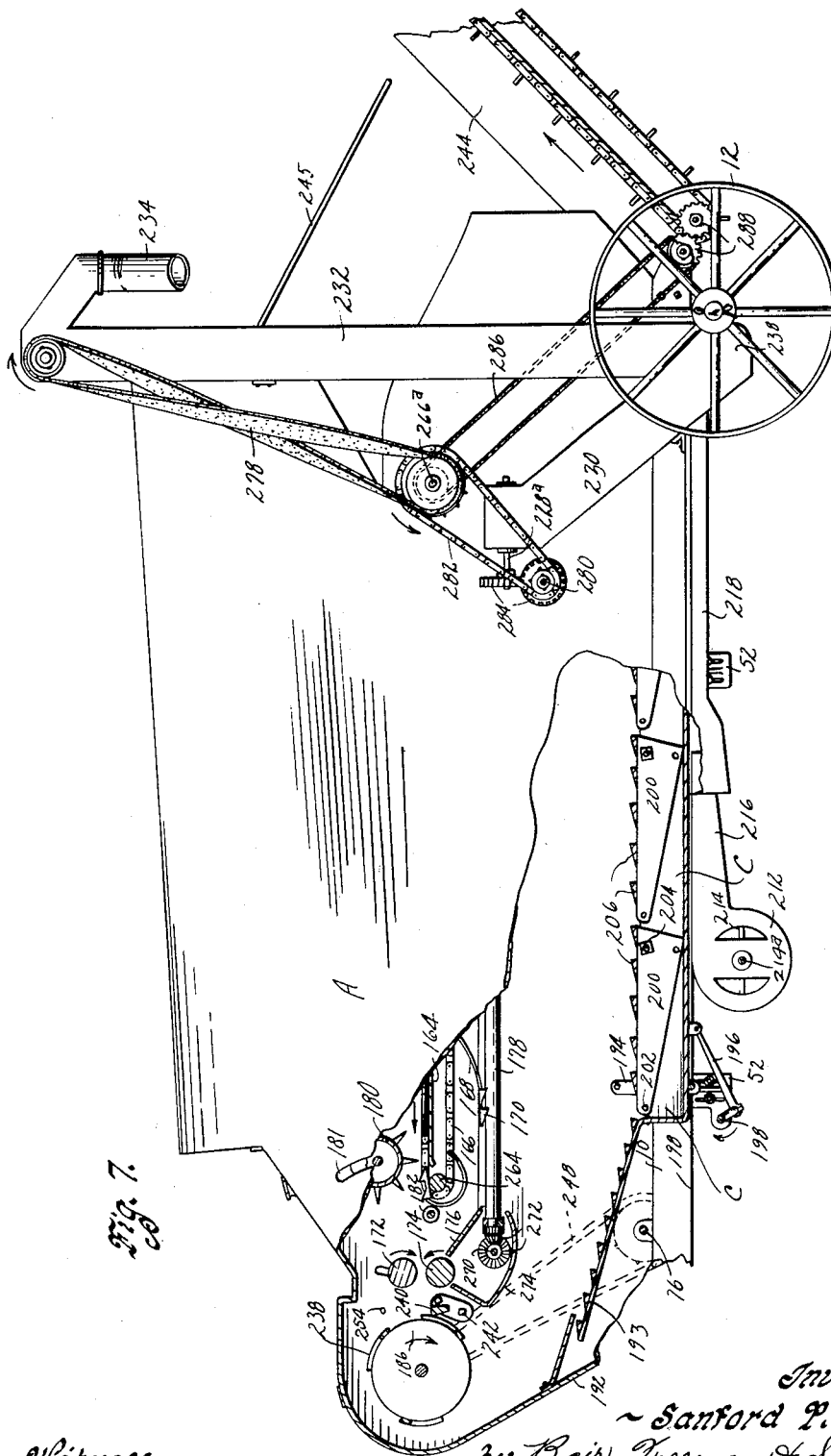

Patented Oct. 24, 1933

1,931,782

UNITED STATES PATENT OFFICE 1,931,782

CORN COMBINE

Sanford P. Week, Fort Dodge, Iowa, assignor of one-half to John H. Norton, Fort Dodge, Iowa Application November 30, 1931
Serial No. 577,902

11 Claims. (Cl. 56—16)

The object of my invention is to provide a corn combine which is simple, durable and comparatively inexpensive to manufacture.

Another object of my invention is to provide a corn combine which includes a corn cutting and gathering unit and a corn harvester unit, the cutting and gathering unit being adapted to cut and gather corn and elevate it into the harvester unit.

A further object is to provide such a corn combine with a novel harvester unit having interchangeable mechanism and adjustable parts so that the corn stalks can be either shredded or cut into ensilage, snapping rolls being provided for snapping the ear corn from the stalks and husking rolls being provided for husking the ears of corn.

A further object is to provide a corn combine consisting of a wheeled harvester unit and a laterally extending frame having a wheel supporting the outer side thereof and the frame itself supporting the corn cutting and gathering unit.

Still another object is to provide for separating shelled corn from the stalks and husks and elevating the ear corn and shelled corn for deposit in a receptacle, such as a wagon being driven alongside the machine.

Another object is to provide an elevator for elevating ensilage from the harvester unit and depositing it in a wagon or the like pulled behind the harvester unit when the harvester unit is adjusted for ensilage cutting.

Still a further object is to provide gatherer boards with troughs for receiving any ears of corn which might be knocked off the stalks of corn as they pass over the gatherer boards, conveyer means being provided for the gatherer boards to convey such ears of corn to the mechanism which elevates it to the harvester unit.

Still a further object is to provide novel means for advancing ear corn along husking rolls, which means is carried by the stalk conveyer.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 3 is a plan view of the corn combine.

Figure 4 is a sectional view on the line 4—4 of Figure 1 showing specific construction of the gatherer board on an enlarged scale.

Figure 4a is a detailed sectional view on the line 4a—4a of Figure 4.

Figure 4b is a fragmental view of Figure 4 showing a modified construction.

Figure 4c is a plan view of a gathering wheel shown in Figure 4b.

Figure 5 is a transverse sectional view on the line 5—5 of Figure 3.

Figure 7 is a side elevation partly in section showing parts interchanged and adjusted with respect to the showing in Figure 6.

Figure 10 is a sectional view on the line 10—10 of Figure 6 showing the driving mechanism for the husking rolls.

Figure 1:
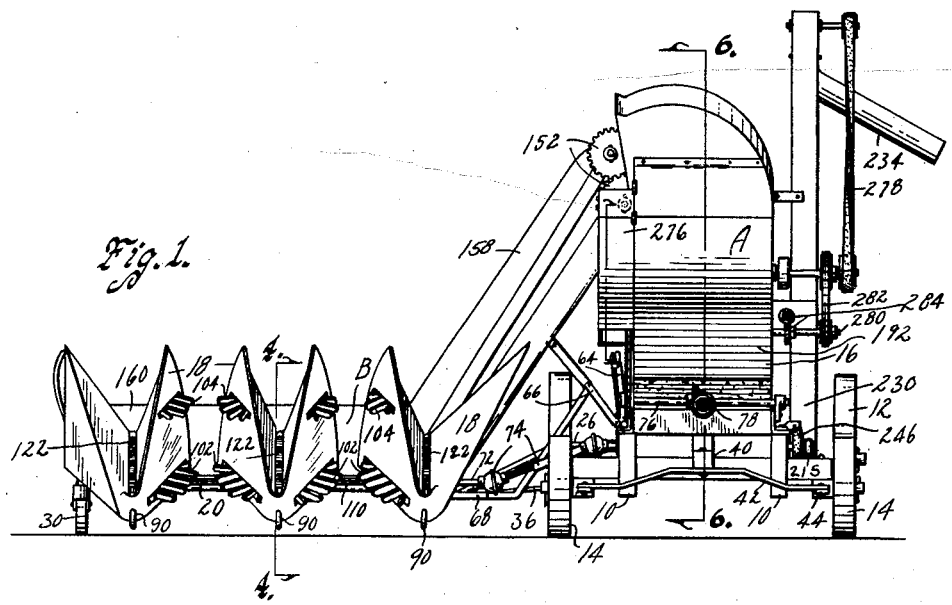
Figure 1 is a front elevation of a corn combine embodying my invention.

On the accompanying drawings, I have used the reference character A to indicate a harvester unit and B to indicate a corn cutting and gathering unit. The harvester unit A consists generally of a frame 10 having rear wheels 12 and front steerable wheels 14, a harvester casing 16 and the various machinery and mechanism contained in the casing 16 for harvesting corn. The corn cutting and gathering unit B consists generally of gatherer boards 18, a sickle bar 20 for cutting the corn, a platform 22 for receiving the corn and a platform elevator 24 for elevating the corn from the platform to the harvester unit A.

Figure 2:
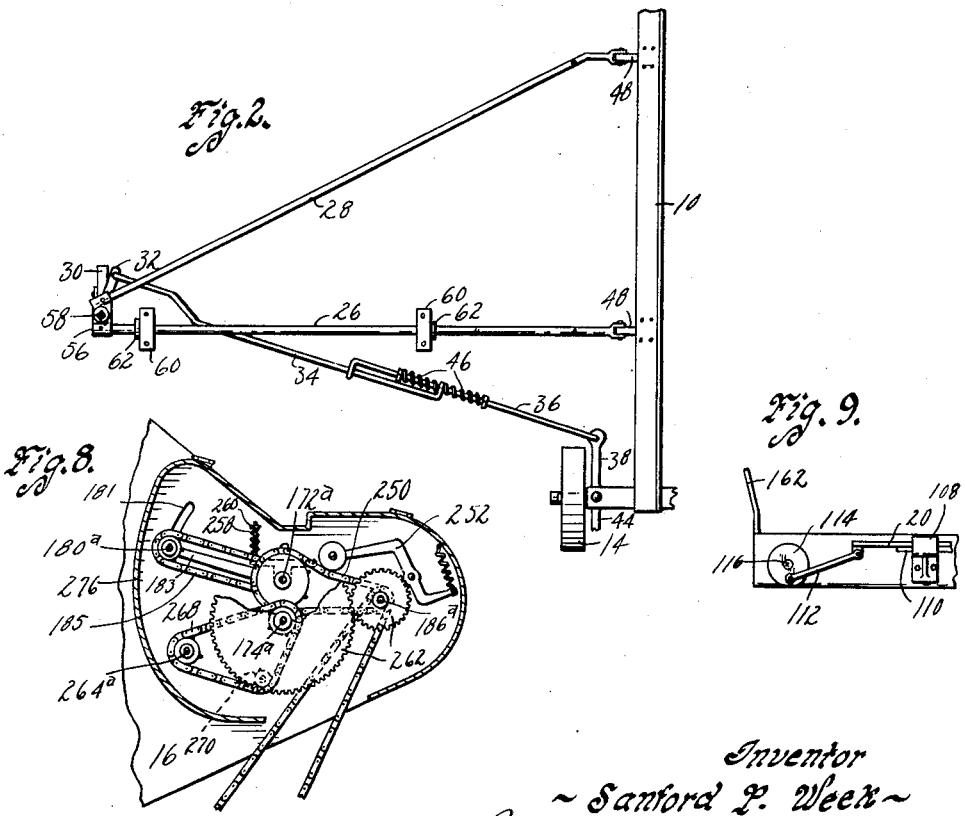
Figure 2 is a plan view of a side frame member of the harvester unit and the supporting frame for the corn cutting and gathering unit.

A laterally extending frame consisting of members 26 and 28, has one end pivotally secured to the frame 10 of the harvester unit and its other end supported by a wheel 30 (see Figure 2). The wheel 30 is a caster wheel and where desirable, such as on hilly ground, may be provided with a steering arm 32 connected by links 34 and 36 with a steering arm 38 of the front steerable wheels 14. The wheels 14 are steered by a tongue 40 having a link connection 42 with steering arms 44. The tongue 40 is pivoted to the frame 10 and provides a pulling connection whereby the units A and B may be pulled behind a tractor. The links 34 and 36 are slidably associated with each other and balanced springs 46 retain them resiliently in predetermined relation to each other but allow movement of one relative to the other under strain such as would be imparted by the tendency of the wheel 30 to follow a path other than that dictated by the links 34 and 36.

Figure 6:
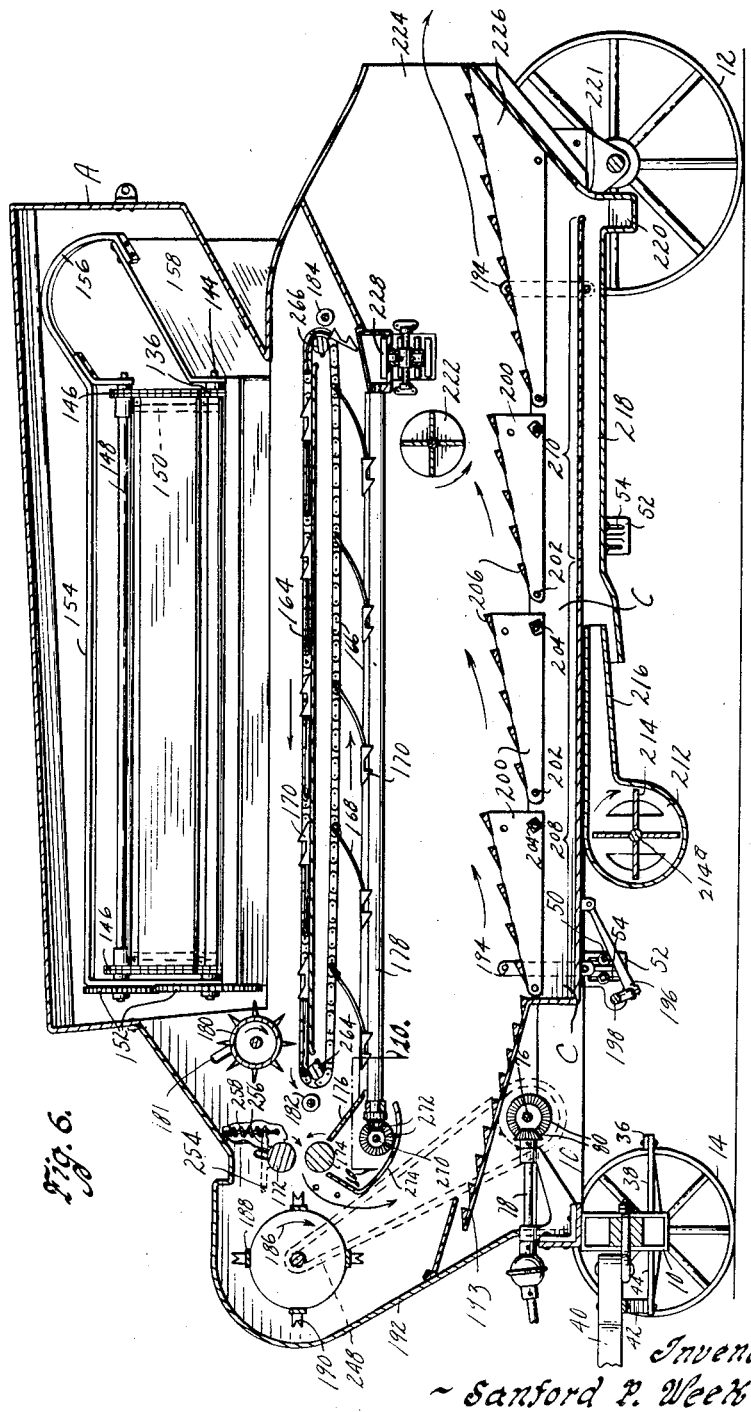
Figure 6 is a longitudinal view through the corn harvester unit, as taken on the line 6—6 of Figure 1.

The inner ends of the members 26 and 28 are pivoted to brackets 48 which are bolted by bolts 50 to brackets 52 on the frame 10 (see Figures 5 and 6). The brackets 52 are provided with vertically arranged slots 54 so that the bolts 50 and the brackets 48 may be vertically adjusted for adjusting the laterally extending frame to any desired elevation for different conditions encountered. The outer ends of the members 26 and 28 are connected with a bracket 56 in which is threaded a set screw 58 for adjusting the elevation of the bracket 56 relative to the wheel 30.

Bearings 60 are oscillatably mounted on the frame member 26 and retained against longitudinal movement relative thereto by collars 62. The bearing members 60 support the platform 22 and all other parts of the corn cutting and gathering unit in substantially balanced position. The corn cutting and gathering unit may be adjusted about the frame member 26 as a pivot by means of an adjusting lever 64. The lever 64 is retained in any adjusted position in an obvious manner as shown in Figure 5 and is connected by a link 66 with an arm 68 extending from the corn cutting and gathering unit.

Journaled in bearings 70 is a cutting and gathering unit drive shaft 72. The shaft 72 is connected by a universal and sliding joint connection indicated at 74 with a crank shaft 198 on the harvester unit frame 10. The crank shaft 198 is driven from a drive shaft 76 by a belt 246. The drive shaft 76 is driven from the tractor which pulls the units in the ordinary manner, a forwardly extending propeller shaft 78 being provided for this purpose. The shafts 76 and 78 are operatively connected with each other by bevel gears 80.

The gatherer boards 18 are provided with bearings 82 (see Figure 4) for oscillation on the drive shaft 72, the drive shaft thereby acting as a pivot for the gatherer boards. The gatherer boards are adjustable relative to the platform 22 by link members 84 and 86 which are secured to the platform 22 and the gatherer boards 18, respectively. The links 84 and 86 are telescopically associated with each other which allows upward movement of the forward ends of the gatherer boards, but prevent downward movement. Bolts 88 are provided for this purpose for engagement with the rear ends of the links 86 and extend selectively through spaced openings in the links 84 for adjustment purposes.

The forward ends of the gatherer boards 18 are provided with shoes 90 to engage the ground and lift the gatherer boards when bumps are encountered, the telescopic connections between the links 84 and 86 permitting such raising of the gatherer boards.

It will be noted that three gatherer boards are provided for handling two rows of corn. The machine, of course, can be made with any number of gatherer boards for handling any number of rows of corn. The center gatherer board is provided on each side with a set of gathering chains, while the side gatherer boards are provided on one only with a set of gathering chains which will now be described. There are lower and upper gathering chains indicated at 91 and 92, respectively. The rear ends of the chains 91 and 92 are driven by sprockets 94 and 96, respectively.

The forward ends of the chains 91 and 92 extend around idlers 98. Each set of sprockets 94 and 96 is mounted on a substantially vertical shaft 100 which is suitably journaled relative to the gatherer board. It will be noted that the upper sprocket 96 is larger than the lower sprocket 94 for a purpose which will hereafter be described. The chains 91 and 92 are provided with gathering fingers 102 and 104, respectively, the fingers 104 being preferably longer than the fingers 102.

Each shaft 100 is provided with a bevel gear connection 106 to the drive shaft 72, whereby all the gathering chains 91 and 92 are driven from the drive shaft.

Figure 9:
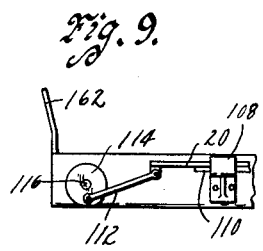
Figure 9 is a sectional view on the line 9—9 of Figure 3 showing a drive for the corn cutting mechanism.

The sickle bar 20 is oscillatably mounted in brackets 108 which support stationary sickle teeth 110. The sickle bar 20 has sickle teeth preferably best shown in Figure 3, for cooperation with the sickle teeth 110 for cutting stalks of corn upon oscillation of the sickle bar 20. As shown in Figure 9, the sickle bar is operatively connected by a pitman 112 with a crank disk 114. The crank disk 114 is mounted on the forward end of a shaft 116 which is driven from the shaft 72 by bevel gears 118.

Stalks of corn which are cut by the sickle bar 20 are gathered by the gathering fingers 102 and 104 and the top ends of the stalks are moved rearwardly, with respect to the corn gathering unit, faster than the lower ends thereof because of the gathering chains 92 traveling faster than the gathering chains 91. This causes the stalks of corn to fall rearwardly on the platform 22 so as to keep them in alignment and insure that the butts of the corn stalks will be directed forwardly.

The foregoing construction obviates the necessity of providing a reel for laying the stalks of corn on the platform as in ordinary grain binder construction.

Where the corn is especially tall a modified form of gathering mechanism can be employed, as shown in Figures 4b and 4c. It will be noted that the shaft 100 extends upwardly beyond the gathering board 18 and has a gathering wheel 101 on its upper end. The gathering wheel 101 is provided with gathering fingers 103. The gathering wheel 101 serves the purpose of an additional gathering chain.

Any ears of corn which are accidentally knocked from the stalks of corn by the impact of the stalks against the gatherer boards 18 will drop into the trough portions of the gatherer boards and be carried rearwardly by conveyor chains 120 at the bottoms of the troughs. The chains 120 are provided with fingers 122 to aid in conveying the ears of corn back to a chute 124 from which they drop onto the platform 22. The forward ends of the chains 120 extend around idlers 126, while the rear ends extend around sprockets 128. The sprockets 128 are mounted on pivots 130 which are connected with the vertical shafts 100 by bevel gears 132 (see Figure 4a.)

It will be noted that the platform elevator 24 is a continuation of the substantially horizontal platform 22. The shaft 116 is provided with sprockets 134 over which chains 136 extend. Cross bars 138 connect the chains 136 and provide for conveyance of the stalks and ears of corn along the platform 22 in the direction of the arrow $a$ and up the platform elevator 24. Idlers 140 mounted on stub shafts, are provided for the chains 136 to extend under at the transition between the horizontal platform 22 and the slanting platform elevator 24. Sprockets 142 are provided at the upper end of the platform elevator 24 for the chains 136 and are secured to a shaft 144.

A floating conveyor 146 of chain and slat construction is pivoted on a shaft 148 at its upper end and floats at its lower end.

Links 150 are pivoted on the shaft 148 for supporting the lower end of the floating conveyor and allowing its floating motion. The shaft 148 is driven from the shaft 144 by gears 152 (see Figure 1). The shaft 148, as best shown in Figure 6, is supported by a bar 154 having a looped rear end 156 connected with a guard flange 158. The guard flange 158 extends downwardly along the rear edge of the platform elevator 24 and connects with a guard flange 160 at the rear end of the platform 22. At the outer side of the platform 22, a guard flange 162 is provided. The guard flanges prevent any stalks of corn from slipping off the platform or the platform elevator. The loop 156 provides space for the tops of the corn stalks to project over the guard flange 158 and be properly directed to fall into the harvester mechanism B.

The harvester mechanism B (see Figure 6) includes a stock conveyor platform 164 over which a stalk conveyor 166 travels. The stalk conveyor 166 is provided with flexible arms 168 carrying hook-like advancing members 170.

The advancing members 170 are adapted for advancing the stalks along the top of the stalk conveyor 166 and toward snapping rolls 172 and 174. This causes the stalks to enter the snapping rolls for snapping the ears of corn therefrom, which then slide down a chute 176 and onto husking rolls 178. A feeder 180 is also provided for aiding in the advancing of the stalks into the snapping rolls 172 and 174.

There is likelihood of the advancing members 170 contacting with the snapping rolls 172 and 174 and accordingly I provide rollers 182 to prevent this. Similar rollers 184 are provided at the rear end of the stalk conveyor 166.

The stalks of corn from which the ear corn has been snapped by the rollers 172 and 174 is advanced toward a cylinder 186. The cylinder 186 has detachably secured thereto, mounting bars 188 and shredder teeth 190. The shredder teeth 190 shred the stalks and they fall onto a platform 192 of a shaker member C. The platform 192 is provided with teeth 193 which aids in shaking the shredded stalks down the platform and into the shaker member.

The shaker member C is supported by hanger links 194 and reciprocation is imparted to the shaker C by a pitman 196 connected with a crank shaft 198. Series of vertical fins 200 are pivoted on rivets or bolts 202 and each fin is connected with the shaker C by a removable bolt 204. The fins 200 are provided with slats 206 and the fins and slats are arranged in fish back formation when the device is adjusted for shredding the corn stalks as in Figure 6.

The shaker C is provided with an imperforate bottom 208 and a perforated bottom 210. A blower 212 having a blower fan 214 therein, is provided with a discharge spout 216 for discharging air through the perforations of the bottom 210. A false bottom 218 is provided below the spout 216 to confine the air and cause it to travel through the perforations 210.

The shaker C is provided for shaking the shredded corn stalks and causing any shelled corn to be extracted therefrom.

Air from the blower 212 is forced through the perforations in the bottom 210 to blow any chaff or husks from the shelled corn. The shelled corn is finally deposited in a transverse chute 220. An opening 221 is provided behind the chute 220 for the air from the blower 214 to pass out of the casing 16.

A beater 222 also aids in extracting the shelled corn from the shredded stalks and husks which fall from the husking rolls 178 and onto the slats 206. The beater 222 in conjunction with the reciprocating motion of the fins 200 and slats 206 tends to discharge the shredded stalks and husks through a discharge opening 224. The shaker C has, as a part thereof, a chute portion 226 which also aids in such discharge of the shredded corn stalks and husks onto the ground for fertilizing purposes.

A transverse conveyor 228 is provided at the rear ends of the husking rolls 178 for conducting the ears of corn from the husking rolls to a chute 230. The chute 230 is best shown in Figure 7 and connects with an elevator 232 having a swivelly mounted discharge spout 234. As best shown in Figure 5, the shelled corn chute 220, which is a part of the shaker C, extends into an enlarged reception end 236 of the elevator 232 so that the shelled corn likewise is discharged from the spout 234.

In Figure 7, I have shown my harvester unit adjusted for ensilage cutting. The cylinder 186 has the bars 188 and the shredder teeth 190 detached therefrom and cutter bars 238 substituted therefor. A companion stationary cutter bar 240 having attaching feet 242 is mounted within the harvester casing 16.

The stalks of corn coming from the snapping rolls 172 and 174 are cut into ensilage by the cutter bars 238 and 240. The ears of corn can first be snapped from the stalks of corn, or the upper snapping roll 172 can be adjusted so that the ears are not snapped therefrom, as will hereinafter be described. The ensilage slides down the platform 192 and onto the slats 206 of the fins 200. It will be noted, however, that the fins have been adjusted to a level position, as it is not desired to separate shelled corn from the ensilage, but the entire corn stalk and the ears of corn thereon are usually cut into ensilage without separating the corn from the stalk.

The ensilage is discharged through the opening 224 and may be elevated into a receptacle, such as a wagon, by means of a detachable elevating conveyor 244. Thus it will be obvious that parts can be interchanged at the front of the harvester casing 16 and adjustment of the shaker C can be made so that the harvester can readily be changed for use as an ensilage cutter instead of a snapper and shredder or vice versa.

Figure 8:
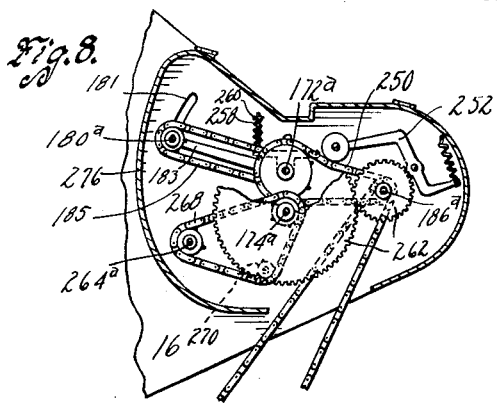
Figure 8 is a sectional view on the line 8—8 of Figure 1 showing driving connections between parts of the harvester mechanism.

I will now describe how the various parts of the harvester unit are driven from the shaft 76. The crank shaft 198 is directly driven from the shaft 76 by a belt 246. The cylinder 186 is directly driven by a chain 248. Referring to Figure 8, the upper snapping roll 172, which is mounted on a shaft 172$a$, is driven by a chain connection 250 from the shaft 186$a$ of the cylinder 186. A spring urged idler 252 is provided for keeping this chain tight since the roller 172 is adjustable about pivots 254.

Arms 256 support the bearings for the shaft 172a and spring tension is imposed on the arms by springs 258. The spring tension may be adjusted by nuts 260 whereby when the springs are tight, all the ears of corn will be snapped from the stalks and when the springs are loose, they will not. When the springs are intermediately adjusted, only the largest ears will be snapped from the stalks of corn.

The lower snapping roll 174 is mounted on a shaft 174a which is driven by gears 262 from the shaft 186a. The stalk conveyor 166 is mounted on sprockets 264 and idler sprockets 266. The sprockets 264 are mounted on a shaft 264a which is driven by a chain 268 from the shaft 174a. A shaft 270 is also driven from the chain 268 and has bevel gear connections 272 with the husking rolls 178 (see Figure 10). The feeder 180 is mounted on a feeder shaft 180a which extends through slots 181 in the sides of the casing 16. The shaft 180a is carried by arms 183 which are pivoted on the shaft 172a. The feeder 180 is driven by a chain 185 from the shaft 172a. This construction permits the feeder 180 to rest on the stalks of corn and to remain thereagainst by gravity, the feeder being raised by the stalks when there are many of them.

9 guard 274 shown in Figures 6 and 7, protects the bevel gears 272. The gearing shown in Figure 8 is covered by a casing 276.

The elevator 232 (see Figure 7) is driven by a belt 278 from the shaft 266a on which the sprockets 266 are mounted. A shaft 280 is driven by a chain 282 from the shaft 266a. Spiral gears 284 drive a shaft 228a of the ear corn conveyor 228.

When the elevator 244 is used, a belt connection 286 and gear connections 288 are provided for operating it from the shaft 266a.

In Figure 5 it will be noted that deflector blades 290 are provided between the husking rolls 178. The coaction of the advancing members 170 with the husking rolls 178 is perhaps best shown in this figure.

The belt 246 is a safety feature, since in case the gathering unit or cutting unit becomes clogged the belt will be thrown off instead of breaking parts of the machine.

I have provided a corn combine, or in other words—a machine which completely harvests corn from the cutting down thereof to the final deposit of the harvested corn in receptacles which are used for conveying it to a place of storage or to deposit of the shredded corn on the ground if desired for fertilizing purposes.

As disclosed, the device is readily changeable for either shredding or ensilage cutting purposes.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In a device of the class described, a corn gathering structure comprising gatherer boards, corn cutting mechanism and gathering chains thereon, sprockets for said chains, shafts for said sprockets, one of said shafts having a gathering wheel thereon to assist in the gathering of tall corn and means for receiving cut and gathered corn from the corn cutting mechanism, gathering chains and gathering wheel.

2. In a device of the class described, a corn gathering structure including gatherer boards having thereon corn gatherer mechanism and means for receiving corn from the corn gatherer mechanism, said gatherer boards each having a depression into which corn may fall and a gatherer board conveyor arranged in each depression for conveying corn falling therein to said means.

3. In a device of the class described, a corn gathering structure including gatherer boards of trough-like construction having thereon corn gatherer mechanism, means for receiving corn from the corn gatherer mechanism and gatherer board conveyors arranged in said trough-like gatherer boards to convey corn falling therein to said means for receiving corn from the corn gatherer mechanism.

4. In a device of the class described, a wheeled harvester unit having rear wheels and steerable front wheels, a laterally extending frame having one side secured thereto and a wheel supporting the other side thereof, said last mentioned wheel being also steerable, a resilient steering connection between it and said front wheels and corn gatherer mechanism supported on said laterally extending frame.

5. In a device of the class described, a wheeled harvester unit having rear wheels and steerable front wheels, a laterally extending frame having one side secured thereto and a wheel supporting the other side thereof, said last mentioned wheel being also steerable, a steering connection between it and said front wheels and corn gatherer mechanism supported on said laterally extending frame.

6. In a device of the class described, a harvester mechanism, means for cutting and gathering corn and conveying it thereinto, said harvester mechanism comprising snapping rolls, and means to discharge snapped corn from said harvester mechanism, said means including shaker elements adjustable to different heights.

7. In a device of the class described, a wheeled harvester mechanism and means for cutting and gathering corn and depositing it in said harvester mechanism, said harvester mechanism comprising an elongated casing adapted to receive the stalks of corn longitudinally thereof, a longitudinally extending stalk conveyer therein, snapping rolls at the discharge end of said stalk conveyer, husking rolls arranged longitudinally below said stalk conveyer and substantially parallel thereto and means carried by the stalk conveyer for advancing ear corn along the husking rolls.

8. In a device of the class described, a wheeled harvester mechanism and means for cutting and gathering corn and depositing it in said harvester mechanism, said harvester mechanism comprising an elongated casing adapted to receive the stalks of corn longitudinally thereof, a longitudinally extending stalk conveyer therein, snapping rolls at the discharge end of said stalk conveyer, husking rolls arranged longitudinally below said stalk conveyer and means carried by the stalk conveyer for advancing ear corn along the husking rolls.

9. In a device of the class described, a harvester structure for cut and gathered corn comprising an elongated casing having a stalk conveyer for receiving corn longitudinally of the casing, snapping rolls at the discharge end of said stalk conveyer, husking rolls beneath and longitudinally of said stalk conveyer, means carried by the stalk conveyer to advance ear corn along the husking rolls, said means comprising flexible arms and advancing elements on the outer ends thereof to engage the ears of corn on said husking rolls.

10. A device of the class described comprising a corn cutting and gathering structure having gatherer boards and a reception platform therebehind, said gatherer boards having upper and lower fingered gathering chains, cutting means for stalks of corn, said cutting means being arranged below the lower gathering chains and means to actuate said lower gathering chains at a predetermined speed and said upper gathering chains at a relatively higher speed to cause the cut stalks of corn to lean rearwardly and fall in a predetermined position on said platform.

11. A device of the class described comprising a corn cutting and gathering structure having gatherer boards and a reception platform therebehind, said gatherer boards having upper and lower fingered gathering chains, cutting means for stalks of corn and means to actuate said lower gathering chains at a predetermined speed and said upper gathering chains at a relatively higher speed to cause the cut stalks of corn to lean rearwardly and fall in a predetermined position on said platform.

SANFORD P. WEEK.